United States Patent [19]

Yaguchi et al.

[11] 4,047,803
[45] Sept. 13, 1977

[54] NEMATIC LIQUID CRYSTAL COMPOSITIONS

[75] Inventors: Masachika Yaguchi, Yokohama; Toshio Jinnai, Kamakura; Shirotsuka, Mikio, Kamakura; Kazuo Totani, Kamakura, all of Japan

[73] Assignee: Dai Nippon Toryo Kabushiki Kaisha, Osaka, Japan

[21] Appl. No.: 703,335

[22] Filed: July 8, 1976

Related U.S. Application Data

[62] Division of Ser. No. 463,228, April 23, 1974, Pat. No. 3,988,054.

[30] Foreign Application Priority Data

Apr. 24, 1973 Japan .................................. 48-46543
June 30, 1973 Japan .................................. 48-73325

[51] Int. Cl.² .......................... G02F 1/13; C09K 3/34; C07C 119/10
[52] U.S. Cl. .............. 350/160 LC; 252/299; 252/408; 260/566 F; 260/566 R
[58] Field of Search ............ 260/566 F, 566 R; 252/299, 408; 350/160 LC

[56] References Cited
U.S. PATENT DOCUMENTS 3,827,780  10/1971  Labes .............. 350/160 LC
3,872,140  3/1975   Klanderman ........ 252/299
3,960,749  6/1976   Fergason .......... 252/299

FOREIGN PATENT DOCUMENTS 2,024,269  12/1971  Germany ........... 252/299
4,892,284  11/1973  Japan ............. 252/299
4,718,783  9/1972   Japan ............. 252/299

OTHER PUBLICATIONS

Usol'tseva, V. A. et al., Russian Chem. Rev., vol. 32, No. 9, pp. 495–507 (Sept. 1963).
Dave, J. S. et al., J. Chem. Soc., Part 4, pp. 4305–4309 (1955).

Primary Examiner—Benjamin R. Padgett
Assistant Examiner—T. S. Gron
Attorney, Agent, or Firm—Sughrue, Rothwell, Mion, Zinn and Macpeak

[57] ABSTRACT

When a 4,4'-substituted benzylideneaniline compound having specific substituents is compounded in a nematic liquid crystal material, a liquid crystal composition having a positive dielectric anisotropy and a broad mesomorphic range extending above and below room temperature can be obtained. An electro-optical element comprising a thin layer of this liquid crystal composition filled and supported between two substrates can be used for light modulation and display.

2 Claims, 4 Drawing Figures

NEMATIC LIQUID CRYSTAL COMPOSITIONS

This is a division of application Ser. No. 463,228, filed Apr. 23, 1974, now U.S. Pat. No. 3,988,054.

BACKGROUND OF THE INVENTION

This invention relates to a nematic liquid crystal composition. More particularly, the invention relates to a nematic liquid crystal composition, the direction of the molecular axis of which is changed without occurrence of dynamic scattering by application of an electric field, a magnetic field and the like.

It is known that nematic liquid crystals (hereinafter referred to as "N-liquid crystals") can be used for display, light modulation and the like by utilizing their specific property that optical characteristics are changed under application of electric fields, magnetic fields, ultrasonic waves and the like. Such elements comprise, in general, an N-liquid crystal filled and supported between two substrates disposed to confront each other with a distance smaller than about 50 $\mu$, at least one of which is transparent, and the change in the molecular arrangement caused under application of electric fields, magnetic fields, ultrasonic waves and the like is utilized for light modulation.

Compounds forming such N-liquid crystal are divided into two types depending on the molecular structure and dielectric properties, one type being characterized in that the molecular axis and electric dipole are substantially vertical to each other (the liquid crystal of this type will hereinafter be referred to as "Nn-liquid crystal") and the other being characterized in that the molecular axis and electric dipole are substantially in parallel (the liquid crystal of this type will hereinafter be referred to as "Nn-liquid crystal"). Accordingly, the Nn-liquid crystal indicates an N-liquid crystal having a negative dielectric anisotropy, and the Np-liquid crystal indicates an N-liquid crystal having a positive dielectric anistropy.

In N-liquid crystal electro-optical elements heretofore generally used, the mechanism of scattering caused by application of an electric field or the like, which is known as "dynamic scattering mode (DSM)", is utilized, and Nn-liquid crystals are used for such elements. Most of known N-liquid crystals belong to the Nn-type.

It is also known that elements comprising an Np-liquid crystal filled and supported between substrates can be utilized for light modulation. Such elements are prepared by rubbing surfaces of substrates in one direction with fabric, paper or the like, piling two rubbed substrates so that the rubbing directions in the substrates are in parallel or cross each other with a certain angle, and injecting a liquid crystal between the so piled substrates. Between the substrates, the molecular axes of the Np-liquid crystal are made in parallel with the substrate faces and are arranged in the substantially same direction in a plane parallel to the substrate. In case, for example, the two substrates are disposed so that the rubbing directions cross each other with a certain angle, if seen from the direction vertical to the substrates, molecular axes are arranged in the state continuously distorted from one another between adjacent faces, and on the interface between the liquid crystal and substrate the molecular axes are aligned in the same direction as the rubbing direction. When polarized light passes through this liquid crystal layer, the polarization plane of the light is rotated depending on the degree of distortion of the molecular axis direction. This distortion of the molecular axis direction can be relaxed by application of an appropriate electric or magnetic field. Accordingly, by adjusting the intensity of the electric or magnetic field it is made possible to adjust rotation of the polarization plane of polarized light passing through the element.

Since the light modulation process utilizing an Np-liquid crystal electro-optical element formed between two polarizing plates disposed to cross each other exhibits a mechanism quite different from an Nn-liquid crystal electro-optical element, a higher contrast ratio can be obtained when used for display of a pattern. Further, the Np-liquid electro-optical element can be utilizedfor construction of a Boolean algebra generator, a logical product gate, a "nor" gate and a more complicated logical circuit. If an Np-liquid crystal electro-optical element capable of responding quickly is employed, it can be utilized for display of a three-dimensional television or moving picture.

The threshold value causing DSM in an Nn-liquid-crystal electro-optical element is about 7 to about 10 $V_{RMS}$ and the saturation voltage is about 40 $V_{RMS}$, and the Nn-liquid crystal electro-optical element is generally actuated under about 25 to about 40 $V_{RMS}$. In contrast, in the case of an Np-liquid crystal electro-optical element, the threshold value is about 1.5 to 4 $V_{RMS}$ and the saturation voltage is about 7 to about 10 $V_{RMS}$. Accordingly, a lower voltage electric source can be used, and the consumption of electric power can be reduced and the life of the element can be prolonged. Further, in the case of an Np-liquid crystal electro-optical element, since the wavelength region of rays of transmission varies depending on the electric voltage when it changes within the range of the threshold value to the saturation voltage, it can be used for display of colors. Moreover, also a device comprising an Np-liquid crystal element filled and supported between electrodes in which the direction of rubbing electrode faces are arranged in parallel can be used for display of colors.

In case an Np-liquid crystal electro-optical element is so constructed that the molecular axis direction are random between substrates, the light is scattered when no electric field is applied to the element, and when an electric field is applied, the quantity of transmission light increases because molecular axes are oriented vertically to the substrates. In this case, use of a polarizing plate is unnecessary.

Most of N-liquid crystals that are presently known in the art are Nn-liquid crystals, and N-liquid crystal substances and compositions which take a nematic mesophase at least at room temperature and have a positive dielectric anisotropy are hardly known in the art.

In Japanese Patent Application KOKAI No. 18783/72, it is disclosed that a mixture of an Nn-liquid crystal and 4-cyano-benzylidene-4'-n-alkylaniline is a liquid crystal composition having the same electro-optical characteristics as those of an Np-liquid crystal.

SUMMARY OF THE INVENTION

It is therefore a primary object of this invention to provide a liquid crystal composition having a broad mesomorphic range covering temperatures above and below room temperature and having the same electro-optical characteristics as those of an Np-liquid crystal.

Another object of this invention is to provide an electro-optical element having a reduced threshold voltage and a positive dielectric anisotropy.

The foregoing object can be attained by incorporating a 4,4'-substituted benzylideneaniline compound having specific substituents ino an Nn- or Np-liquid crystal substance. Such compound will hereinafter be referred to as "positive dielectric anisotropy-imparting agent".

DETAILED DESCRIPTION OF THE INVENTION

The positive dielectric anistropy-imparting agent to be used in this invention may be represented by the formula

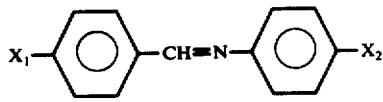
(I)

wherein one of $X_1$ and $X_2$ is hydrogen or hydroxyl, —R, —OR, —COOH, —COOR, —NHCOR, —NH$_2$ or —COR radicals wherein R is an aliphatic saturated hydrocarbon group having 1 to 20 carbon atoms, when the other of $X_1$ and $X_2$ is halogen, or $X_1$ is hydrogen, halogen or hydroxyl, —R, —OR, —COOH, —COOR or —NHCOR radicals wherein R is as defined above, when $X_2$ is nitro, or $X_2$ is hydrogen, halogen or hydroxyl, a straight alkyl of more than 5 carbon atoms or —COOH, —OR or —COOR radicals wherein R is as defined above, when $X_1$ is nitro, provided that when $X_2$ is halogen, the 2- and 5- positions are also substituted by halogen. Preferably, R is a straight alkyl of 1 to 15 carbon atoms. Particularly, compounds of formula I in which a straight alkyl or alkoxyl group of 1 to 8 carbon atoms is attached direct to the benzene ring are preferred. Examples of the positive dielectric anisotropy imparting agent which may be used are as follows:

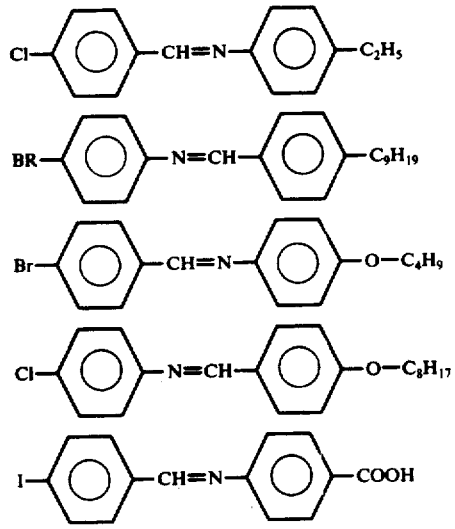

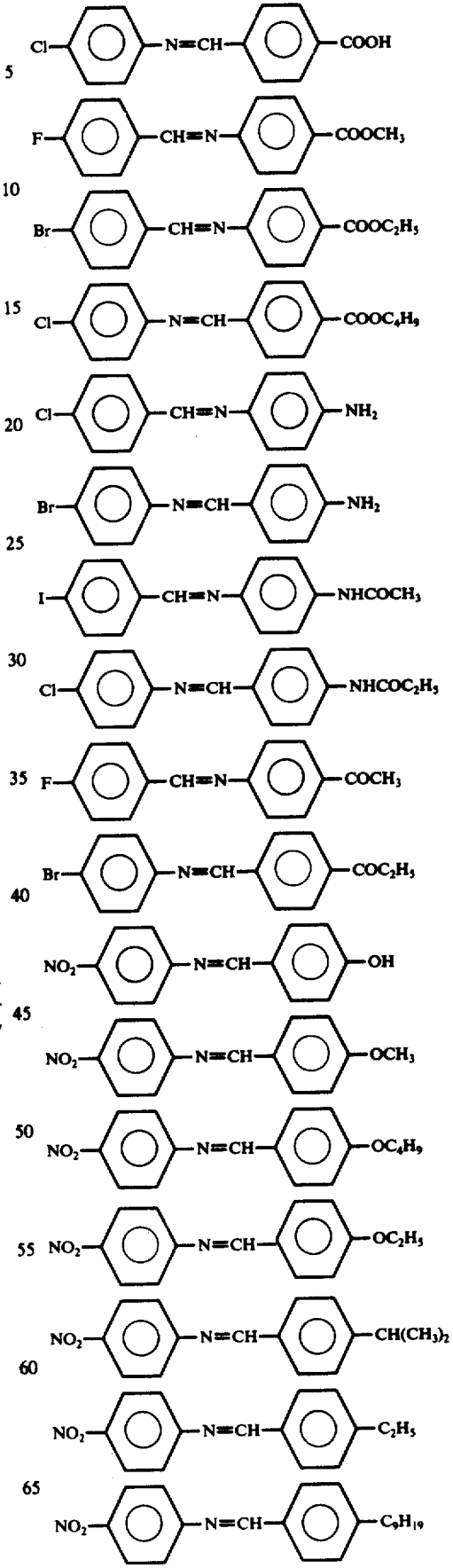

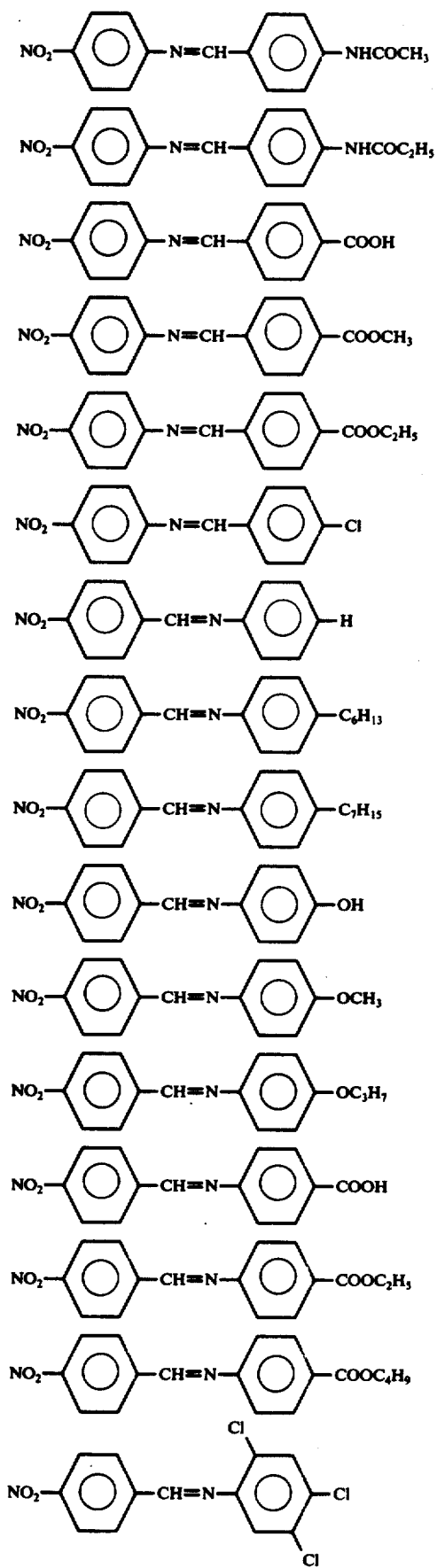

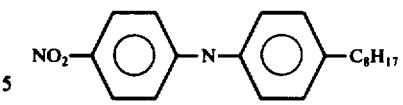

In general, N-liquid substances have a structure represented by the following formula

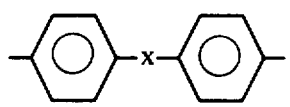

and they are classified into the Schiff base, azo, azoxy, carbonic acid ester, α-chlorostilbene and nitron types depending on the structure of the central group X. Such substances are disclosed in, for example, Proceedings of the IEEE, Vol. 61, No. 7, July 1973, page 814 and Angew. Chem. Internat. Edit., Vol. 10, No. 6, page 410 (1971) and Vol. 8, No. 11, page 884 (1969).

The positive dielectric anisotropy-imparting agent is generally incorporated with an N-liquid crystal compound or composition in an amount of 0.5 to 90% by weight, preferably 2 to 60% by weight, and the amount incorporated of the agent is decided appropriately within this range depending on the kind of the N-liquid crystal used.

Figure 1:
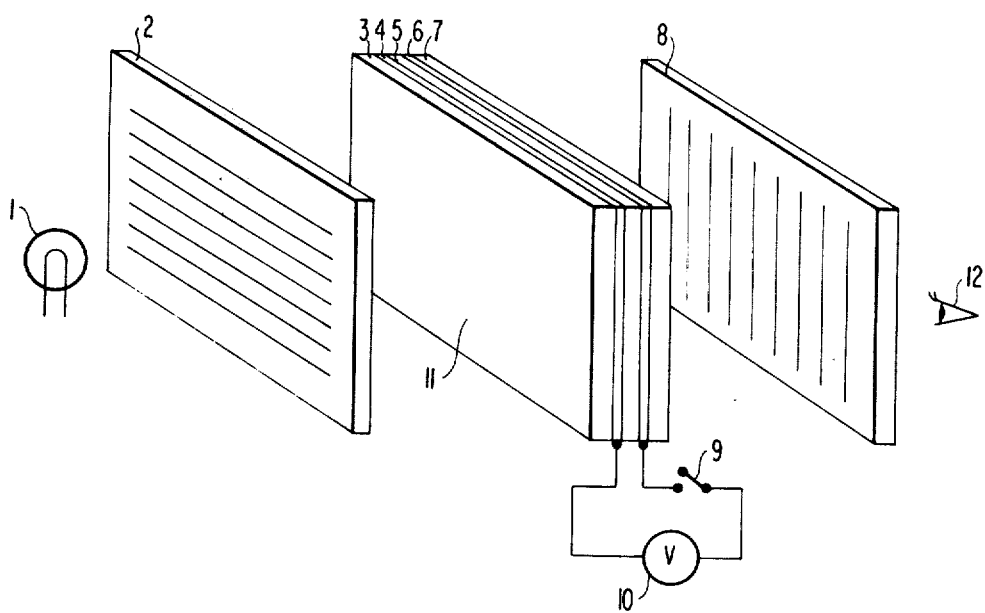
FIG. 1 is an exploded schematic view showing a light modulation device comprising an electro-optical element including a filled and supported Np-liquid crystal, which is disposed in two polarizing plates.

In the light modulation device shown in FIG. 1, glass sheets 3 and 7 having transparent, electrically conductive layers 4 and 6, respectively, are piled so that the rubbing directions cross each other vertically, and an Np-liquid crystal substance or composition 5 is filled and supported between the glass sheets 3 and 7 to form an element. This element is placed between two polarizing plates 2 and 8 of which lattices cross each other vertically. Symbols 1, 9 and 10 indicate a light source, a switch and an electric source, respectively.

By referring to FIG. 1, a light emitted from a light source 1 is polarized by a polarizing plate 2, and the plane of polarization is rotated by 90° by an element 11. Then, the polarized light passes through a polarizing plate 8 and reaches the observation side 12. When an electric field is applied to this element, the above-mentioned distortion of molecular axes is relaxed, and the molecular axes are disposed in parallel with the direction of the electric field at an electric voltage exceeding a certain level, with the result that the distortion is completely eliminated. In this state, the rotation of the plane of polarization becomes smaller depending on the intensiy of the electric field, and the quantity of the light passing through the polarizing plate 8 is lessened. In the state where the distortion is completely eliminated, the light is completely intercepted by the polarizing plate 8. If the polarizing plates 2 and 8 are disposed in parallel with each other, when no electric field is applied, the light is intercepted and the polarizing plate 8 appears dark when seen from the observation side. When an electric field is applied, the quantity of light of transmission increases abruptly, if the electric voltage exceeds a certain threshold value, and the polarizing plate 8 is seen to have a deep gray color. With increase of the electric voltage, the quantity of light of transmission increases, and when the electric voltage reaches or exceeds a certain saturation level, the quantity of light of transmission reaches its maximum and the face of the polarizing plate 8 is seen bright.

The electro-optical element formed with use of the N-liquid crystal composition of this invention has characteristic properties as an Np-liquid crystal electro-optical element such as shown in FIG. 1. When a positive dielectric anisotropy-imparting agent such as mentioned above is incorporated with an Nn-liquid crystal, there is formed an Np-liquid crystal composition characterized in that no dynamic scattering is caused to occur when a magnetic field or the like is applied thereto. In case the above positive dielectric anisotropy-imparting agent is compounded in an Np-liquid crystal, there is formed an Np-liquid crystal composition characterized in that a minimum electric voltage causing the change in the molecular arrangement under application of an electric field, namely the threshold voltage, is much reduced.

According to this invention, when the above-mentioned positive dielectric anisotropy-imparting agent is incorporated with an Nn-liquid crystal or its composition, there can be obtained a liquid crystal composition having a broad mesomorphic range extending above and below room temperature and having electro-optical characteristics same as those of an Np-liquid crystal. Several kinds of Np-liquid crystal substances, such as anisole-p-azobenzene, p-cyanobenzal-p'-n-butylaniline and the like are presently known in the art, and mesomorphic ranges of these compounds are generally above room temperature. If the positive dielectric anisotropy-imparting agent of this invention is incorporated into such Np-liquid crystal compound or its composition, the mesomorphic range can be lowered to a level approximating room temperature.

Figure 2:
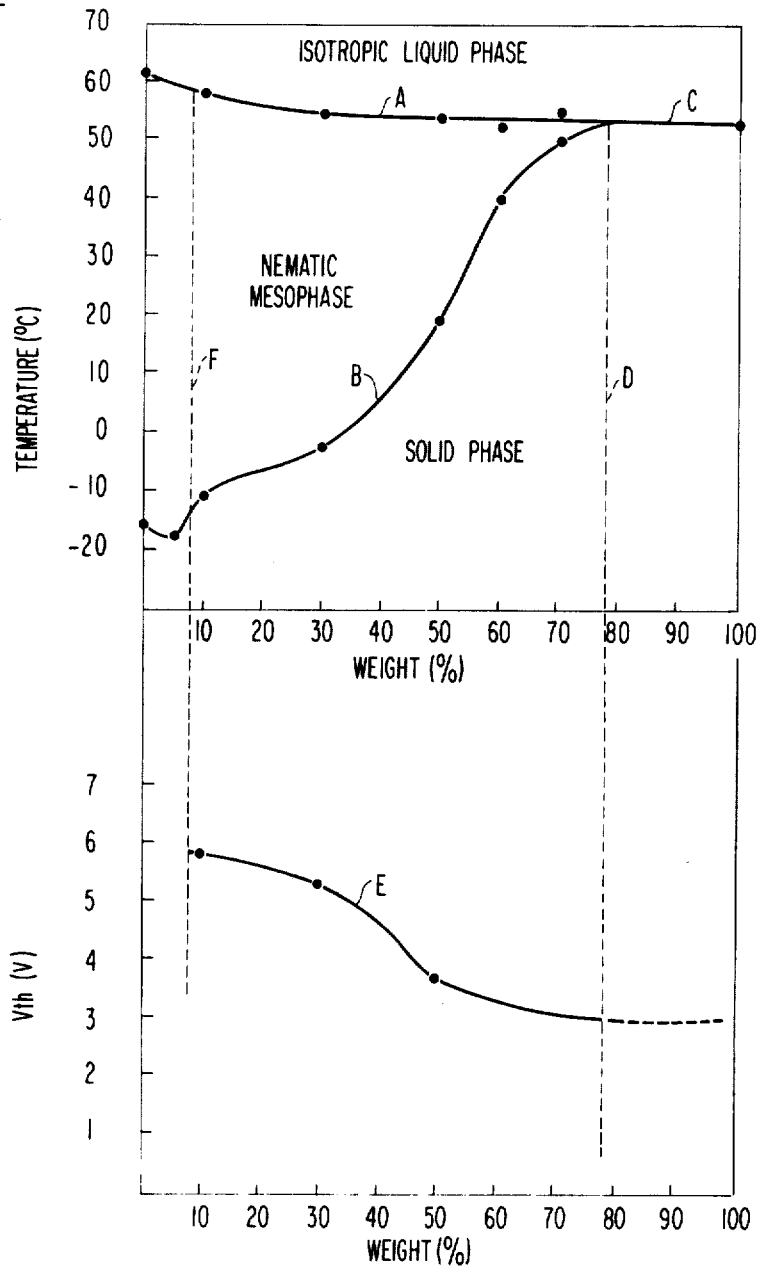
FIGS. 2 to 4 are phase diagrams of N-liquid crystal compositions of this invention.
Figure 2:
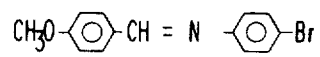
Figure 3:
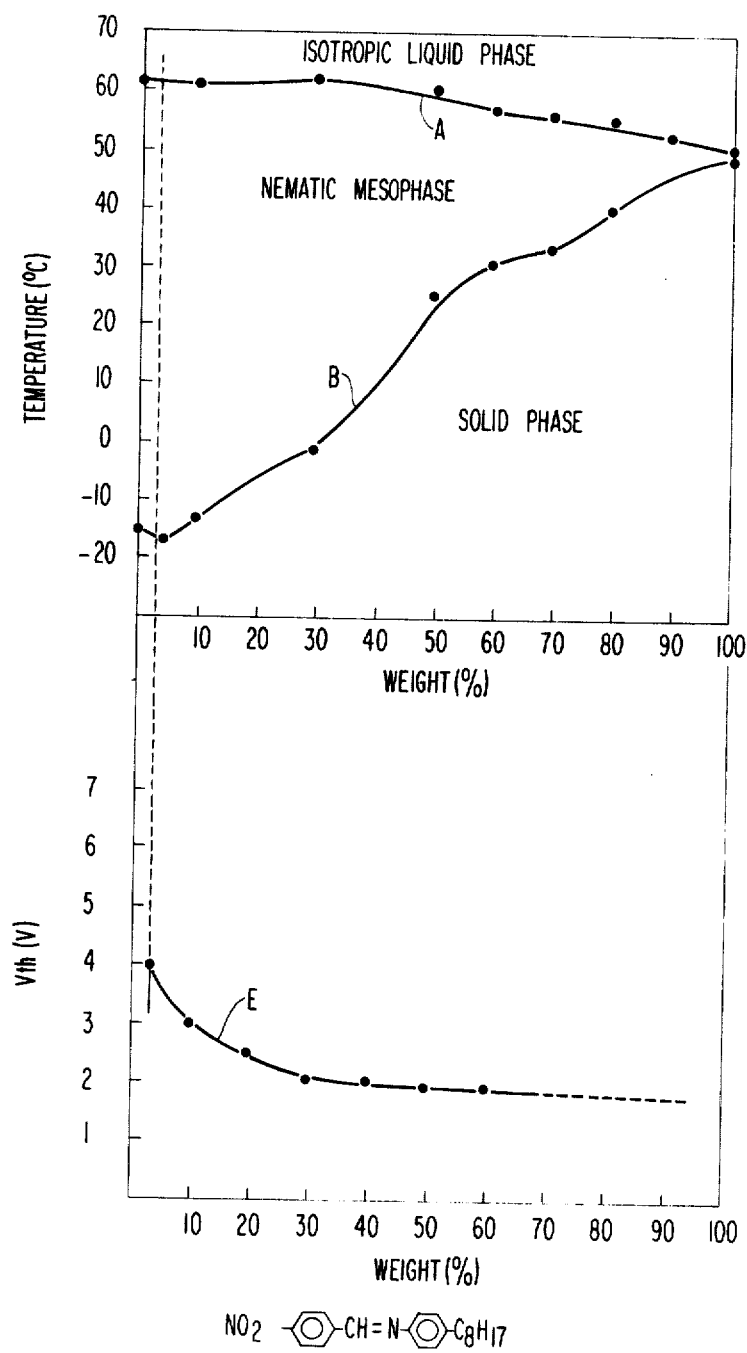

FIGS. 2 and 3 show characteristics of compositions formed by incorporating as the positive dielectric anisotropy-imparting agent the positive dielectric anisotropy-imparting agent intoan Np-liquid crystal composed of 2 parts by weight of p-cyanophenyl-p'-heptylbenzoate and 1 part by weight of p'-cyanophenyl-n-butylbenzoate (the mesomorphic range being 25° to 50° C). Also in this case, the mesomorphic range can be enlarged or the threshold electric voltage can be lowered by adjusting the amount of the positive dielectric anisotropy-imparting agent.

It has been found that among positive dielectric anisotropy-imparting agents represented by the general formula I, compounds in which $X_1$ is a nitro group and $X_2$ is an alkyl group having 7 to 15 carbon atoms are Np-liquid crystal compounds. These compounds can be used alone or in the form of mixtures of two or more of them as liquid crystal materials for the above-mentioned light modulation element. Further, it is also possible to add other positive dielectric anisotropy-imparting agents to these liquid crystal compounds.

As pointed above, the positive dielectric anisotropy-imparting agent of this invention has a structure similar to those of N-liquid crystal substances. Therefore, when it is incorporated into an N-liquid crystal substance, it exhibits a good compatibility.

This invention will now be illustrated in detail by reference to the following non-limitative Examples. It has been confirmed that when electro-optical elements comprising a thin layer of N-liquid crystal compositions of Examples 1 to 13 filled and supported between two substrates were used for devices such as shown in FIG. 1, the elements exhibited the positive dielectric anisotropy.

In this case, the liquid crystal element was prepared by placing a glass plate provided with a conductive layer of $SnO_2$ and lead wire on a flat flannel, rubbing the surface of the glass plate with the flannel at a press of

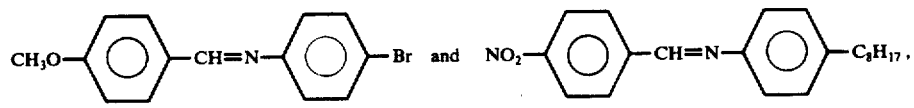

repsectively, into an Nn-liquid crystal composed of an equi-weight mixture of p-methoxybenzylidene-p'-butylaniline and p-ethoxybenzylidene-p'-butylaniline (the mesorange being −15° to 60° C.). The curve B indicates the transition temperature at which the solid phase is converted to the nematic mesophase when the temperature of the composition is elevated. The curve A indicates the transition temperature at which the nematic mesophase is converted to the isotropic liquid phase, and the curve C indicates the transition temperature at which the solid phase is converted to the isotropic liquid phase. On the right side of the broken line D (the amount incorporated being about 76 to 78% by weight), no nematic mesophase is present. The curve E indicates the threshold electric voltage. On the left side of the broken line F (the amount incorporated being about 7 to about 8% by weight), the composition takes a form of Nn-liquid crystal, and on the right side the composition takes a form of Np-liquid crystal. It is possible to adjust the composition based on these graphs shown in FIGS. 2 and 3 so that desired mesomorphic range and threshold electric voltage can be attained.

Figure 4:
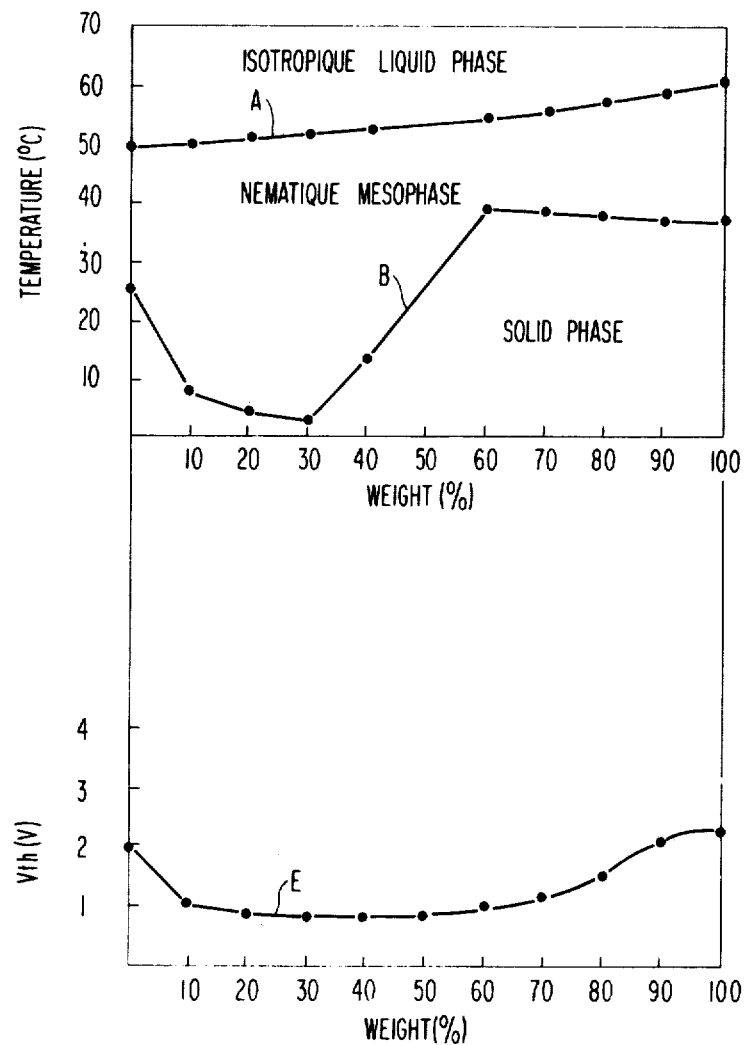

FIG. 4 shows characteristics of compositions formed by incorporating p-nitrobenzylidene-p'-heptylaniline as 500 gcm² in one direction over a length of 20 cm, fixing a spacer of a polyethyleneterephthalate film of 18 μ in thickness on the surface of one of two glass plates so treated, filling with a liquid crystal material, placing the other glass plate thereon in such a way that the two rubbing alternatives fall at right angles with each other, and fixing the two plates at the end with a clip. The liquid crystal element thus obtained was provided between a pair of polarizing plates of which lattices cross each other vertically. When the quantity of light of transmission changed in accordance with the applied electric voltages, the liquid crystal material was identified to be Np-liquid crystal.

EXAMPLE 1

A Schiff base type equi-weight mixture, having a mesomorphic range of −15° to 60° C, of p-methoxybenzylidene-p'-butylaniline (MBBA) and p-ethoxybenzylidene-p'-butylaniline (EBBA), as a Nn-liquid crystal composition was incorporated with the positive dielectric anisotropy imparting agent given in Table 1. The composition obtained thus was in form of a homogenous compatibility and exhibited a broad mesomorphic range extending above and below room temperature.

Table 1
| Run No. | Positive Dielectric Anisotropy Imparting Agent | Amount of Addition Weight % | Mesomorphic Range °C |
|---|---|---|---|
| 1 | 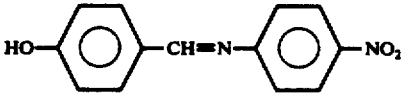 | 2 | −14 ~ 49 |
| 2 | | 10 | −11 ~ 13 |
| 3 | 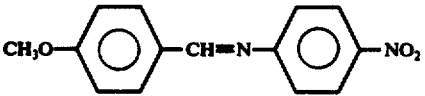 | 10 | −12 ~ 58.9 |
| 4 | 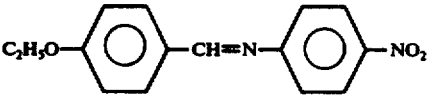 | 10 | −10 ~ 62.4 |
| 5 | | 30 | −6 ~ 62.8 |
| 6 |  | 5 | 10 ~ 35 |
| 7 | 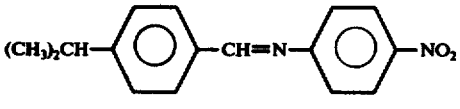 | 10 | −22 ~ 33.5 |
| 8 | 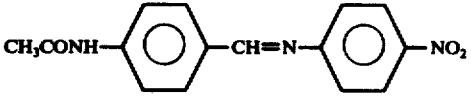 | 10 | 13 ~ 59 |
| 9 | 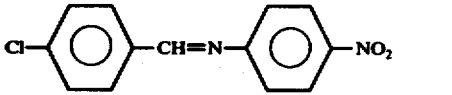 | 10 | −16 ~ 45 |
| 10 | | 30 | −2 ~ 19 |
| 11 | 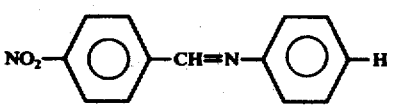 | 10 | −12 ~ 58 |
| 12 |  | 10 | −12 ~ 60 |
| 13 | | 30 | 26 ~ 62 |
| 14 | 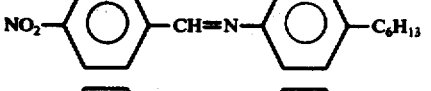 | 10 | −18 ~ 24 |
| 15 | 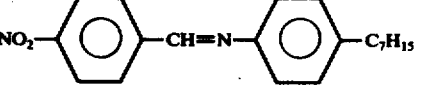 | 10 | −4 ~ 61 |
| 16 | | 30 | 32 ~ 65 |
| 17 |  | 2 | −8 ~ 50 |
| 18 | 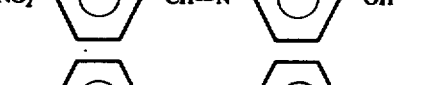 | 10 | −25 ~ 41 |
| 19 | | 30 | −6 ~ −2 |
| 20 | 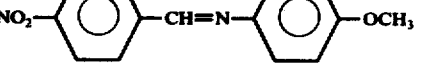 | 1 | −12 ~ 58 |

Table 1-continued

| Run No. | Positive Dielectric Anisotropy Imparting Agent | Amount of Addition Weight % | Mesomorphic Range °C |
|---|---|---|---|
| 21 | $NO_2$—⟨◯⟩—CH=N—⟨◯⟩—$C_8H_{17}$ | 10 | −13 ~ 61 |
| 22 | | 30 | −1 ~ 62 |
| 23 | $Cl$—⟨◯⟩—CH=N—⟨◯⟩—$C_4H_9$ | 25 | 3 ~ 57 |
| 24 | | 30 | 10 ~ 55 |
| 25 | $Cl$—⟨◯⟩—CH=N—⟨◯⟩—$C_7H_{15}$ | 30 | −1 ~ 55.5 |
| 26 | $CH_3O$—⟨◯⟩—CH=N—⟨◯⟩—Br | 30 | −2 ~ 55.0 |
| 27 | | 50 | 20 ~ 54.0 |
| 28 | $CH_3O$—⟨◯⟩—CH=N—⟨◯⟩—Cl | 30 | 20 ~ 56.0 |

EXAMPLE 2

An azo type mixture, having a mesomorphic range of 29° C ~ 72° C, of 25% by weight of p-ethoxy-p'-n-amylazobenzene and 75% by weight of p-methoxy-p'-n-amylazobenzene, as a Nn-liquid crystal composition was incorporated with the positive dielectric anisotropy imparting agent given in Table 2. The composition obtained thus was in form of a homogeneous compatibility and exhibited a broad mesomorphic range extending above and below room temperature.

EXAMPLE 3

An azoxy type equi-weight mixture, having a mesomorphic range of -35° ~ 89° C, of p-methoxy-p'-n-butyl azoxybenzene, p-methoxy-p'-n-hexyl-azoxybenzene, p-methoxy-p'-p-n-octyl-azoxybenzene and p-ethoxy-p'-n-butylazoxybenzene, as a Nn-liquid crystal composition was incorporated with the positive dielectric anisotropy imparting agent given in Table 3. The composition obtained thus was in form of a homogeneous compatibility and exhibited a broad mesomorphic range extending above and below room temperature.

Table 2

| Run No. | Positive Dielectric Anisotropy Imparting Agent | Amount of Addition Weight % | Mesomorphic Range °C |
|---|---|---|---|
| 29 | $Cl$—⟨◯⟩—CH=N—⟨◯⟩—$C_4H_9$ | 30 | 38 ~ 62 |
| 30 | | 25 | 28 ~ 65 |
| 31 | $Cl$—⟨◯⟩—CH=N—⟨◯⟩—$C_7H_{15}$ | 30 | 35 ~ 60 |
| 32 | $CH_3O$—⟨◯⟩—CH=N—⟨◯⟩—Br | 30 | 42 ~ 63 |
| 33 | $CH_3O$—⟨◯⟩—CH=N—⟨◯⟩—Cl | 30 | 33 ~ 52 |
| 34 | $NO_2$—⟨◯⟩—CH=N—⟨◯⟩—$C_7H_{15}$ | 10 | 20 ~ 72 |

Table 3

| Run No. | Positive Dielectric Anisotrophy Imparting Agent | Amount of Addition Weight % | Mesomorphic Range °C |
|---|---|---|---|
| 35 | Cl—⟨O⟩—CH=N—⟨O⟩—C₄H₉ | 30 | −15 ~ 70 |
| 36 | Cl—⟨O⟩—CH=N—⟨O⟩—C₇H₁₅ | 30 | −13 ~ 70 |
| 37 | CH₃O—⟨O⟩—CH=N—⟨O⟩—Br | 30 | −9 ~ 71 |
| 38 | CH₃O—⟨O⟩—CH=N—⟨O⟩—Cl | 30 | −7 ~ 65 |
| 39 | | 50 | 21 ~ 59 |

EXAMPLE 4

10% by weight of p-nitrobenzylidene-p'-n-heptylaniline were incorporated with an azoxy type equi-weight mixture, having a mesomorphic range of 10° ~ 87° C, of p-methoxy-p'-n-hexylazoxybenzene and p-ethoxy-p'-n-hexylazoxybenzene, as a Nn-liquid crystal composition. The composition (Run No. 40) thus obtained exhibited a homogeneous nematic mesophase at temperatures of 6° to 87° C.

EXAMPLE 5

10% by weight of p-nitrobenzylidene-p'-n-heptylaniline were incorporated with a carbonic acid ester type liquid crystal, p-carbobutoxy-oxy-(p'-hexyloxy)phenyl benzoate having a mesomorphic range of 44° to 84° C as a Nn-liquid crystal. The composition (Run No. 41) thus obtained exhibited a homogeneous nematic mesophase at temperatures of 29° to 75° C.

EXAMPLE 6

A composition consisting of 50% by weight of an equi-weight mixture of MBBA and EBBA and 50% by weight of an equi-weight mixture of p-methoxy-p'-butylazobenzene, p-ethoxy-p'-butylazobenzene and p-methoxy-p'-hexylazobenzene becomes Nn-liquid crystal at −15° to 80° C.

A composition (Run No. 42) obtained by incorporating 10% by weight of p-ethoxybenzylidene-p'-nitroaniline into the above Nn-liquid crystal composition exhibited a homogeneous nematic mesophase at −18° ~ 70° C.

EXAMPLE 7

10% by weight of p-nitrobenzylidene-p'-hexylaniline were incorporated to a composition, having a mesomorphic range of −25° ~ 75° C, consisting of 50% by weight of an equi-weight mixture of MBBA and EBBA and 50% by weight of an equi-weight mixture of p-methoxy-p'-butylazoxybenzene, p-ethoxy-p'-butylazoxybenzene, p-ethoxy-p'-hexylazoxybenzene and p-ethoxy-p'-octylazoxybenzene.

The composition (Run No. 43) obtained thus exhibited a homogeneous nematic mesophase at −29° ~ 75° C.

EXAMPLE 8

A composition (Run No. 44) consisting of 50% by weight of p-nitrobenzylidene-p'-n-heptylaniline and 50% by weight of p-nitrobenzylidene-p'-n-octylaniline exhibited a homogeneous nematic mesophase as a Np-liquid crystal compound at 40° ~ 58° C.

EXAMPLE 9

10% by weight of p-nitrobenzylidene-p'-hexylaniline were incorporated with a mixture of 50% by weight of p-nitrobenzylidene-p'-n-heptylaniline and 50% of p-nitrobenzylidene-p'-n-octylaniline.

The composition (Run No. 45) obtained thus exhibited a homogeneous nematic mesophase at 38° ~ 56° C.

EXAMPLE 10

A Np-liquid crystal composition consisting of a mixture of p-cyanophenyl-p'-n-heptylbenzoate and p'-cyanophenyl-p-n-butylbenzoate in the weight ratio 2:1 exhibited a mesomorphic range of 25° to 50° C.

A composition (Run No. 46) obtained by incorporating 10% by weight of p-nitrobenzylidene-p'-n-octylaniline into the above Np-liquid crystal composition exhibited a homogeneous nematic mesophase at 15° to 54° C.

EXAMPLE 11

2% by weight of p-methoxybenzylidene-p'-chloroaniline were incorporated with a Np-liquid crystal material, a mixture of p-cyanophenyl-p'-n-heptylbenzoate and p'-cyanophenyl-p-n-butylbenzoate in the weight ratio 2:1, having a mesomorphic range of 25° to 50° C.

The composition (Run No. 47) obtained thus, was in form of homogeneous compatibility and exhibited a nematic mesophase at 21° ~ 51° C.

EXAMPLE 12

A light modulation device as shown in FIG. 1 was prepared in the same manner as mentioned hereinbefore, using the N-liquid crystal of Run Nos. 27, 28, 33, 38, 39 and 47. Changes in color of rays of transmission were observed varying the applied electric voltages. The results are given in FIG. 4.

Table 4

| Run No. | Crossing Angle of Rubbing Directions | Crossing Angle of Polarizing Plates | Applied Electric Voltages, Volts | Changes in Color |
|---|---|---|---|---|
| 27 | ⊥ | = | 5.3 – 9.8 | Black-White |
| 27 | 45° | = | 5.2 – 9.9 | White-Red-Yellow-Green-Blue |
| 28 | ⊥ | = | 2.5 – 5.5 | Black-White |
| 28 | 45° | = | 2.6 – 5.3 | White-Red-Yellow-Green-Blue |
| 28 | = | ⊥ | 2.4 – 5.3 | White-Black |
| 33 | ⊥ | = | 3.5 – 6.2 | Black-White |
| 38 | ⊥ | = | 3.4 – 6.3 | Black-White |
| 39 | ⊥ | = | 4.1 – 6.4 | Black-White |
| 47 | ⊥ | = | 2.5 – 6.1 | Black-White |

Note - Symbol ⊥ means that the crossing angle is rectangular.
Symbol = means that the crossing angle is parallel.

EXAMPLE 13

A Schiff base type liquid crystal equi-weight mixture, having a mesomorphic range of −35° ~ 76° C, of MBBA, EBBA, p-ethoxybenxylidene-p'-heptylaniline (EBH$_p$A) and p-ethoxybenzylidene-p'-octylaniline (EBOA) as a Nn-liquid crystal composition was incorporated with positive dielectric anisotropy imparting agents given in Table 5.

The composition obtained thus was in form of a homogeneous compatibility and exhibited a broad mesomorphic range extending above and below room temperature.

Table 5

| Run No. | Positive Dielectric Anisotropy Imparting Agent | Amount of Addition Weight % | Mesomorphic Range °C |
|---|---|---|---|
| 51 | HO—⌬—CH=N—⌬—NO$_2$ | 10 | −30 ~ 50 |
| 52 | CH$_3$O—⌬—CH=N—⌬—NO$_2$ | 10 | −31 ~ 73 |
| 53 | C$_2$H$_5$O—⌬—CH=N—⌬—NO$_2$ | 20 | −20 ~ 75 |
| 54 | (CH$_3$)$_2$CH—⌬—CH=N—⌬—NO$_2$ | 10 | −5 ~ 52 |
| 55 | CH$_3$CONH—⌬—CH=N—⌬—NO$_2$ | 10 | −36 ~ 62 |
| 56 | Cl—⌬—CH=N—⌬—NO$_2$ | 10 | −3 ~ 74 |
| 57 | NO$_2$—⌬—CH=N—⌬—H | 20 | −20 ~ 51 |
| 58 | NO$_2$—⌬—CH=N—⌬—C$_6$H$_{18}$ | 10 | −29 ~ 74 |
| 59 | NO$_2$—⌬—CH=N—⌬—C$_7$H$_{15}$ | 10 | −21 ~ 73 |
| 60 | NO$_2$—⌬—CH=N—⌬—OH | 10 | −33 ~ 43 |
| 61 | NO$_2$—⌬—CH=N—⌬—OCH$_3$ | 10 | −11 ~ 74 |

Table 5-continued

| Run No. | Positive Dielectric Anisotropy Imparting Agent | Amount of Addition Weight % | Mesomorphic Range °C |
|---|---|---|---|
| 62 | NO₂—⟨○⟩—CH═N—⟨○⟩—COOH | 5 | −30 ~ 69 |
| 63 | NO₂—⟨○⟩—CH═N—⟨○⟩(Cl)(Cl)—Cl | 10<br>20 | −36 ~ 67<br>−15 ~ 39 |
| 64 | NO₂—⟨○⟩—CH═N—⟨○⟩—COOC₂H₅ | 3 | −28 ~ 73 |
| 65 | NO₂—⟨○⟩—CH═N—⟨○⟩—C₈H₁₇ | 10<br>30 | −23 ~ 75<br>−10 ~ 74 |
| 66<br>67 | Cl—⟨○⟩—CH═N—⟨○⟩—C₄H₉ | 20<br>30 | −20 ~ 73<br>3 ~ 72 |
| 68 | Cl—⟨○⟩—CH═N—⟨○⟩—C₇H₁₅ | 30 | −10 ~ 71 |
| 69 | CH₃O—⟨○⟩—CH═N—⟨○⟩—Br | 30 | −13 ~ 69 |
| 70 | CH₃O—⟨○⟩—CH═N—⟨○⟩—Cl | 30 | 2 ~ 75 |

What we claim is:

1. A nematic liquid crystal material having positive dielectric anisotropy consisting of a compound represented by the formula

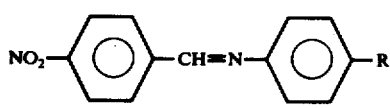

wherein R is n-alkyl group of 7 to 15 carbon atoms.

2. An electro-optical element comprising a pair of electro plates including a thin layer of a nematic liquid crystal material having positive dielectric anisotropy, said nematic liquid crystal material consisting of a compound represented by the formula

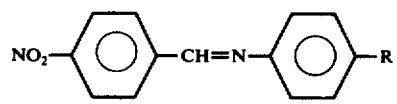

wherein R is n-alkyl group of 7 to 15 carbon atoms.

* * * * *